United States Patent [19]
Smith

[11] Patent Number: 6,012,636
[45] Date of Patent: Jan. 11, 2000

[54] MULTIPLE CARD DATA SYSTEM HAVING FIRST AND SECOND MEMORY ELEMENTS INCLUDING MAGNETIC STRIP AND FINGERPRINTS SCANNING MEANS

[76] Inventor: Frank E. Smith, P.O. Box 27103, Oakland, Calif. 94602

[21] Appl. No.: 08/844,808

[22] Filed: Apr. 22, 1997

[51] Int. Cl.⁷ .............................. G06K 5/00; G06K 7/00
[52] U.S. Cl. ...................... 235/380; 235/382; 235/436; 235/492
[58] Field of Search ................. 235/380, 382, 235/436, 492, 493

[56] References Cited

U.S. PATENT DOCUMENTS

| | | | |
|---|---|---|---|
| 4,443,027 | 4/1984 | McNeely et al. | 235/492 |
| 4,614,861 | 9/1986 | Pavlov et al. | 235/380 |
| 4,641,374 | 2/1987 | Oyama | 455/603 |
| 4,684,791 | 8/1987 | Bito | 235/380 |
| 4,700,055 | 10/1987 | Kashkashian et al. | 235/379 |
| 4,749,982 | 6/1988 | Rikuna et al. | 235/380 |
| 4,851,654 | 7/1989 | Nitta | 235/492 |
| 4,877,945 | 10/1989 | Fujisaki | 235/436 |
| 5,180,902 | 1/1993 | Schick et al. | 235/380 |
| 5,272,319 | 12/1993 | Rey | 235/379 |
| 5,276,311 | 1/1994 | Hennige | 235/380 |
| 5,367,572 | 11/1994 | Weiss | 235/380 |
| 5,434,395 | 7/1995 | Storck et al. | 235/380 |
| 5,521,362 | 5/1996 | Powers | 235/380 |
| 5,530,232 | 6/1996 | Taylor | 235/380 |
| 5,534,683 | 7/1996 | Rankl et al. | 235/380 |
| 5,544,246 | 8/1996 | Mandelbaum et al. | 235/379 |
| 5,741,184 | 4/1998 | Takemoto et al. | 463/43 |

*Primary Examiner*—Donald Hajec
*Assistant Examiner*—Daniel St.Cyr
*Attorney, Agent, or Firm*—Brian Beverly

[57] ABSTRACT

A multiple application card data system comprises a data management device and a user card. The user card includes a first memory for storing provider data, and a second memory, separated from the first memory, for storing data unique to a user. The data management device compares a unique set of user data on the device with the data on the second memory of the user card for identification of the proper user card. The device also includes a stored digital representation of the user's fingerprint and a fingerprint scanner for imaging of a fingerprint for comparison with the digital representation of the user's fingerprint for identification of the proper user. A memory in the device stores copies of data from a plurality of provider data cards. The device enables transfer and storage of the data of one provider on the first memory of the user card, making the user card an effective clone of that provider's data card. The provider data on the first memory can be re-encoded as desired. The user card also includes an electromagnet for time delayed erasure of data stored on the first memory. The data management device includes a card reader capable of simultaneously reading a data card having two magnetic strips.

40 Claims, 9 Drawing Sheets

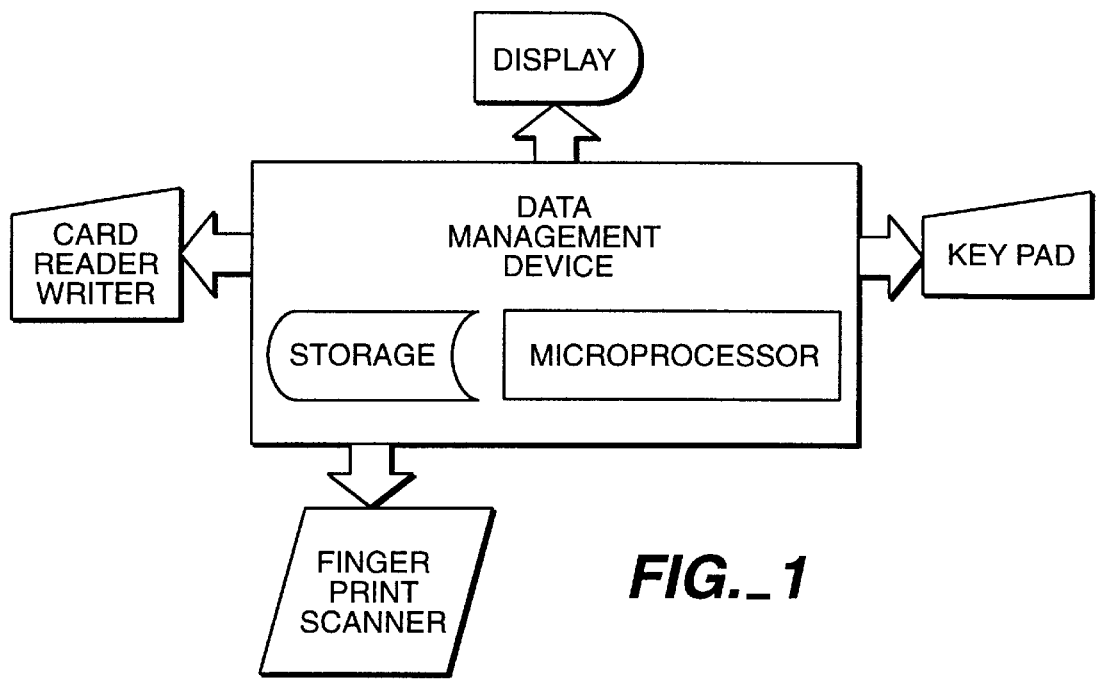
FIG._1
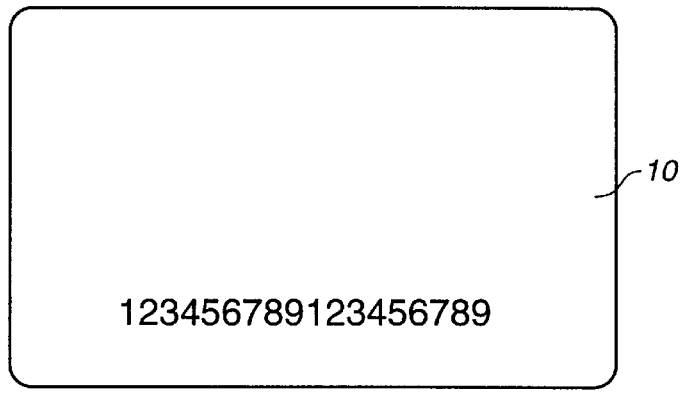
FIG._2A
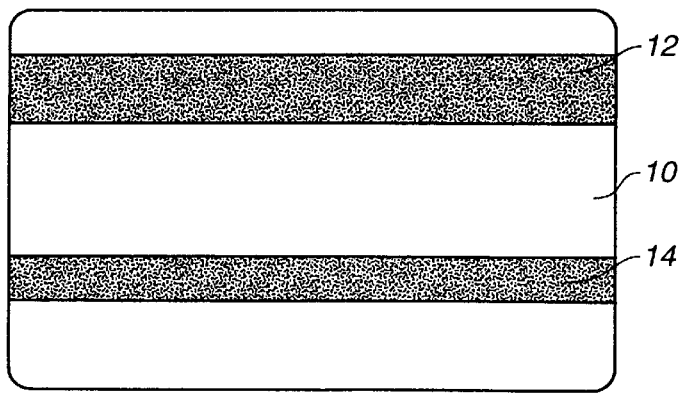
FIG._2B

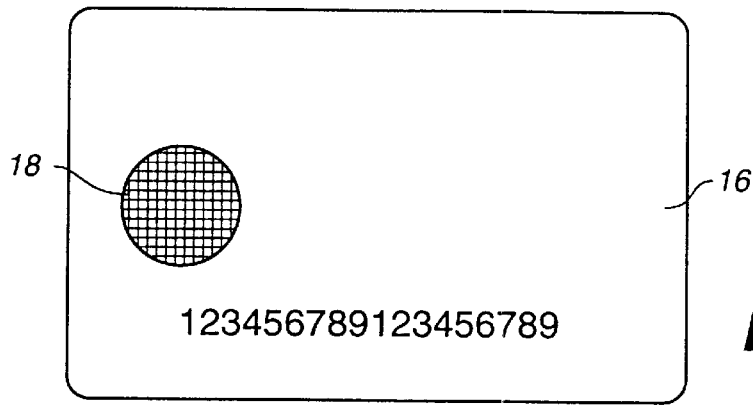
FIG._3A
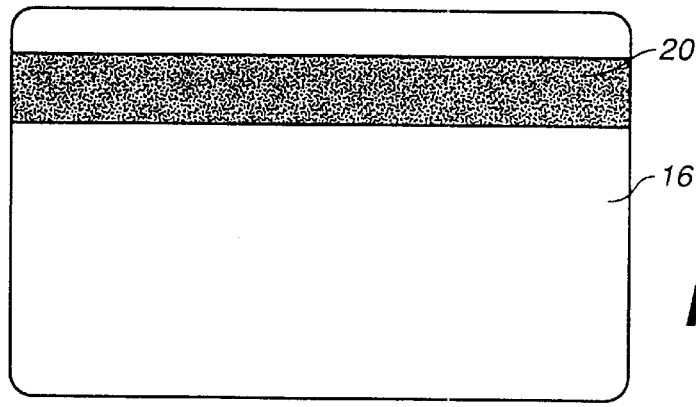
FIG._3B
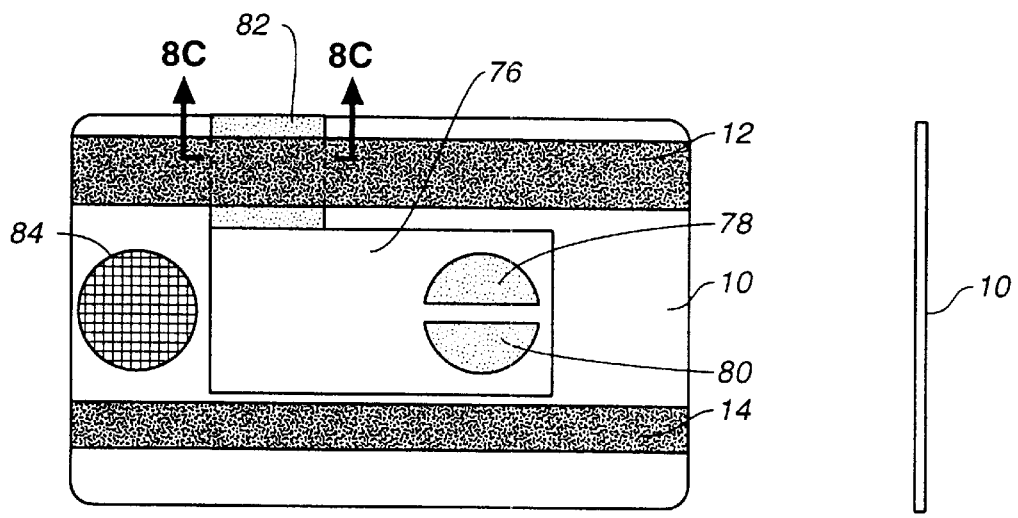
FIG._8A          FIG._8B
FIG._8C

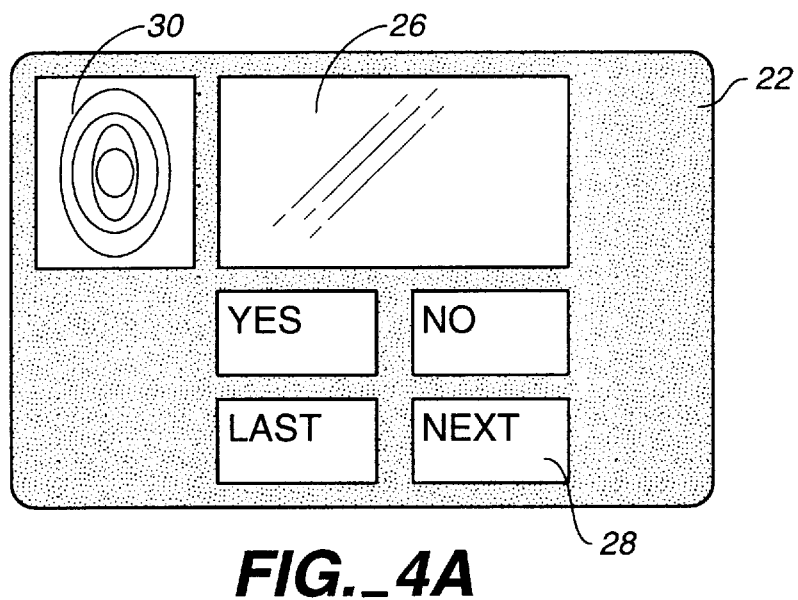
FIG._4A
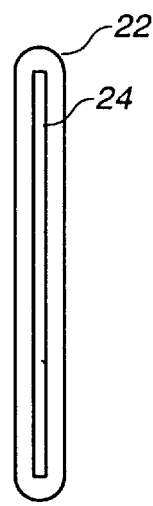
FIG._4B
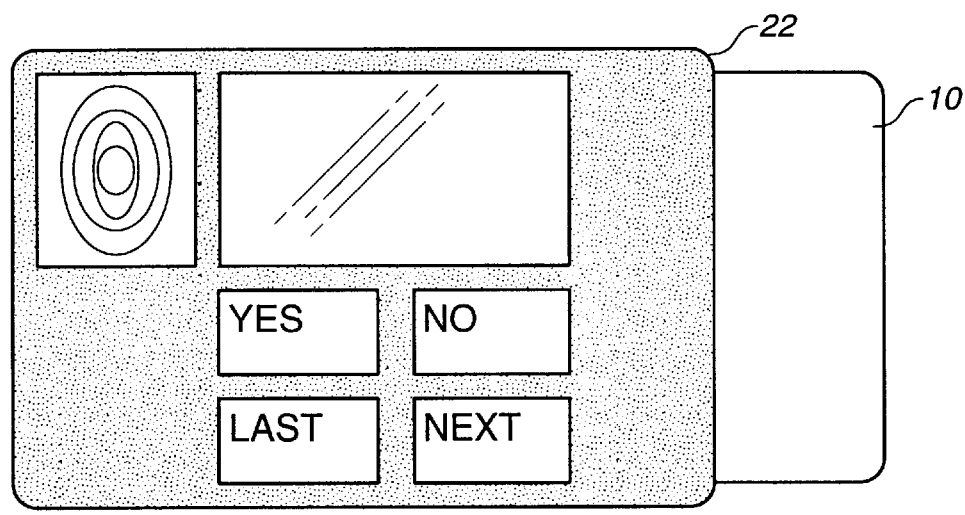
FIG._4C

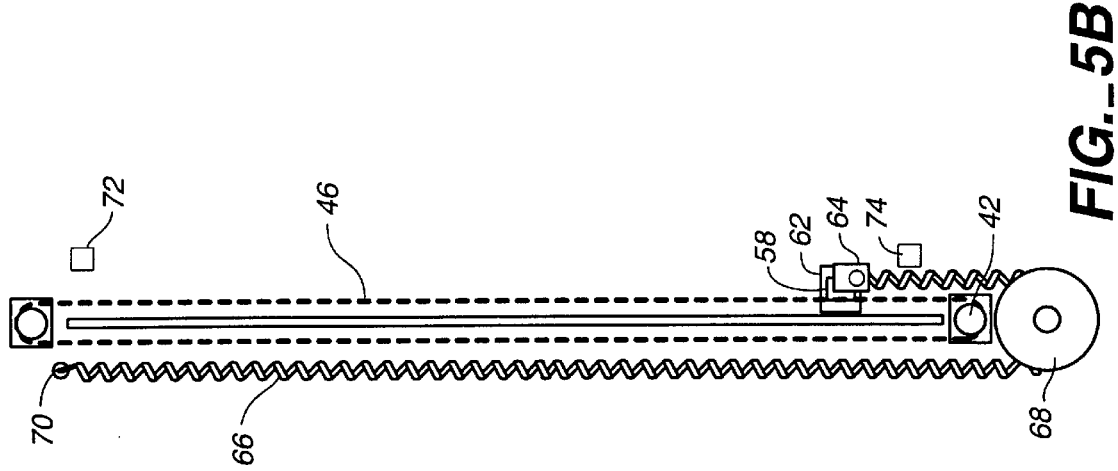
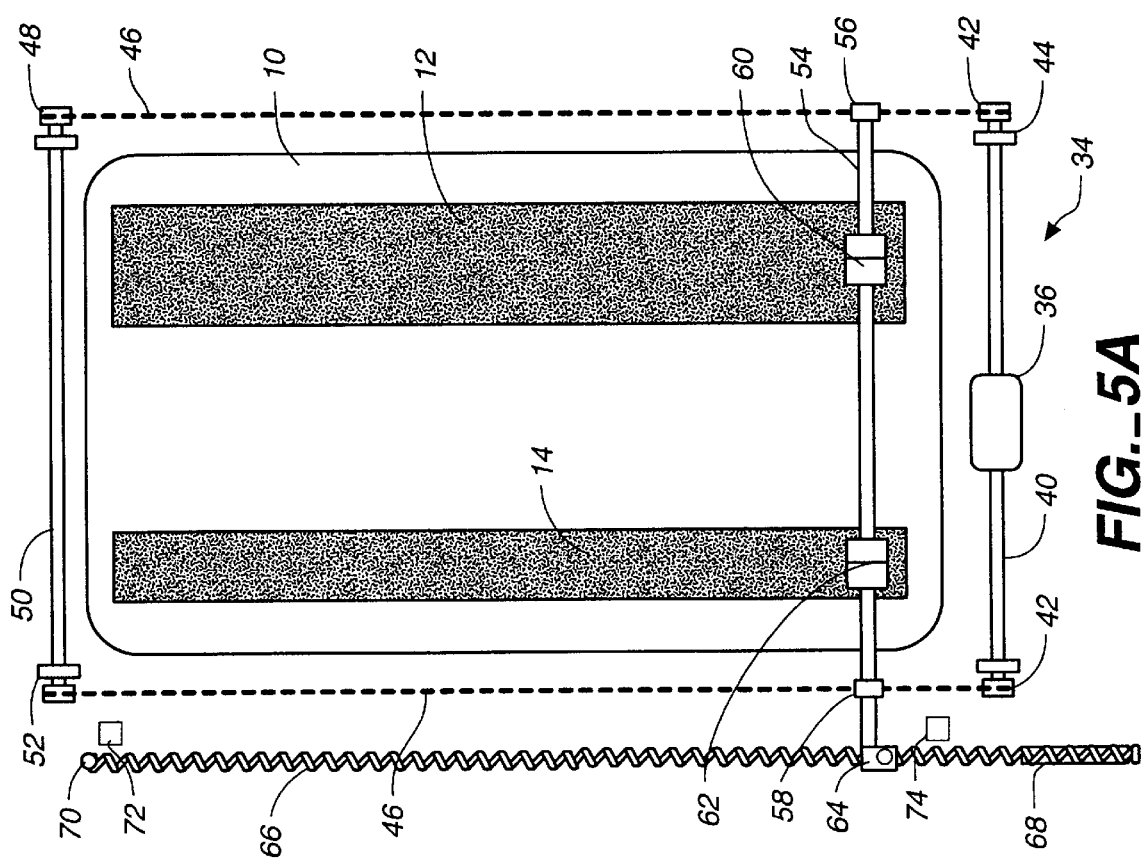

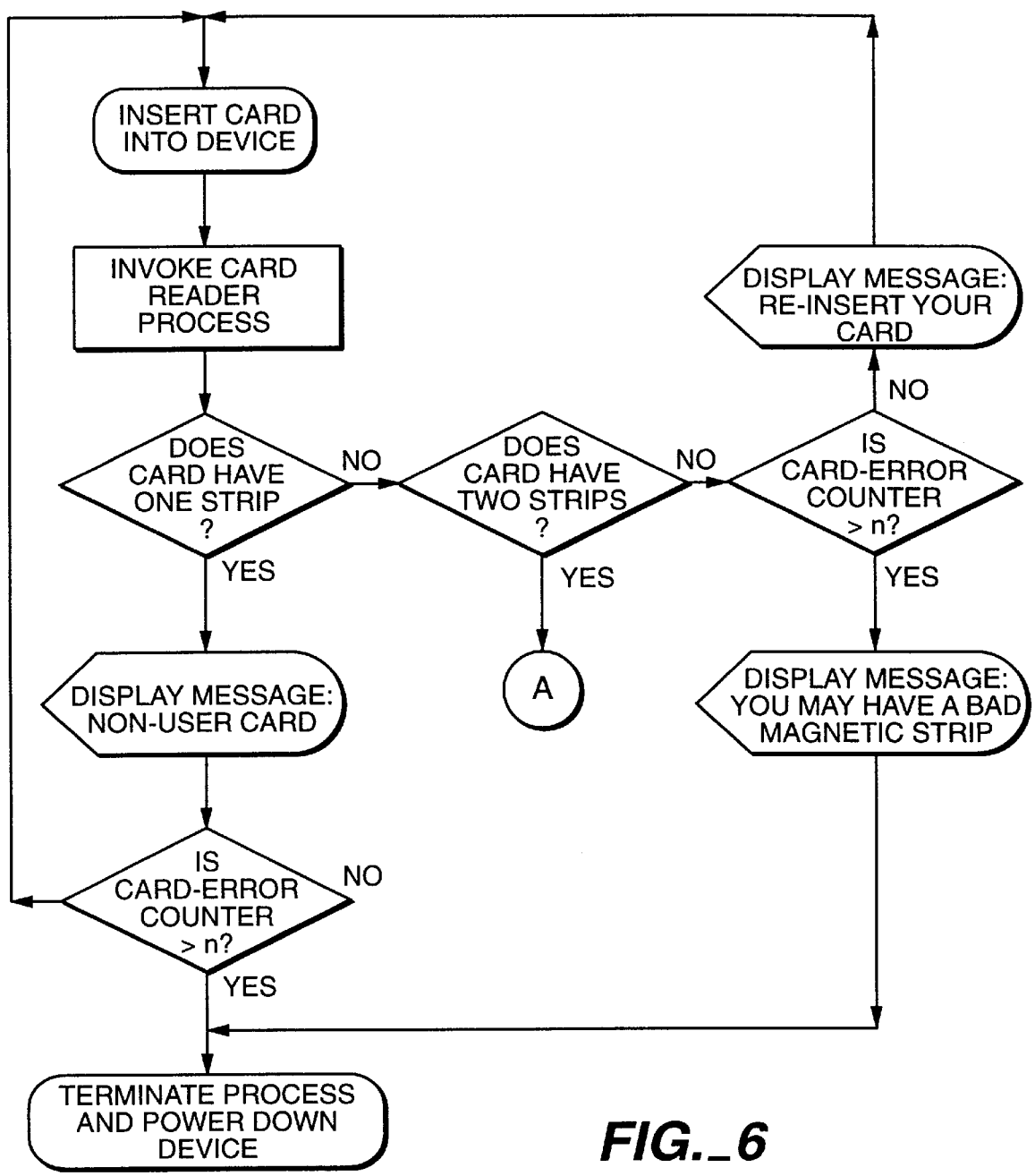
FIG._6

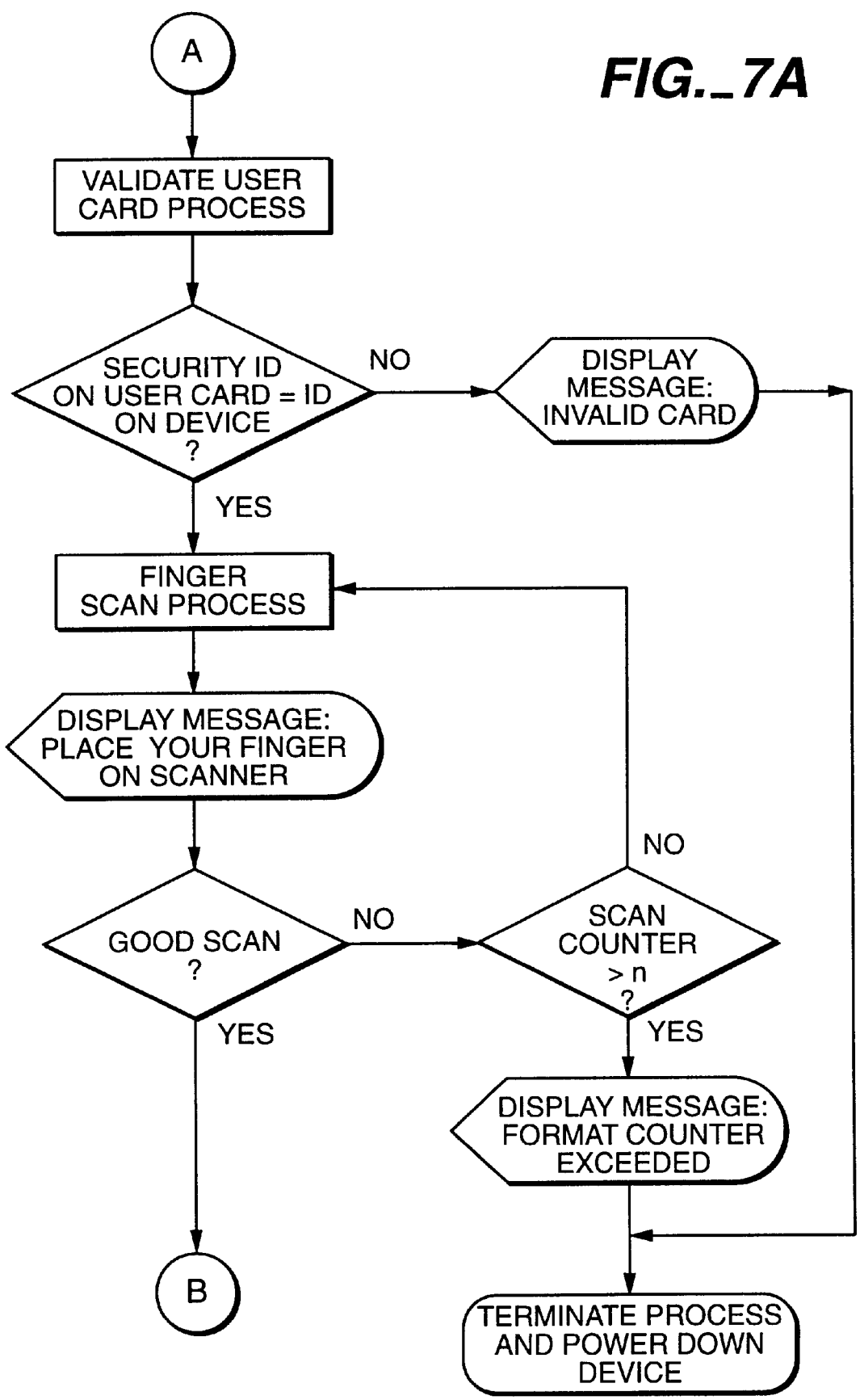
FIG._7A

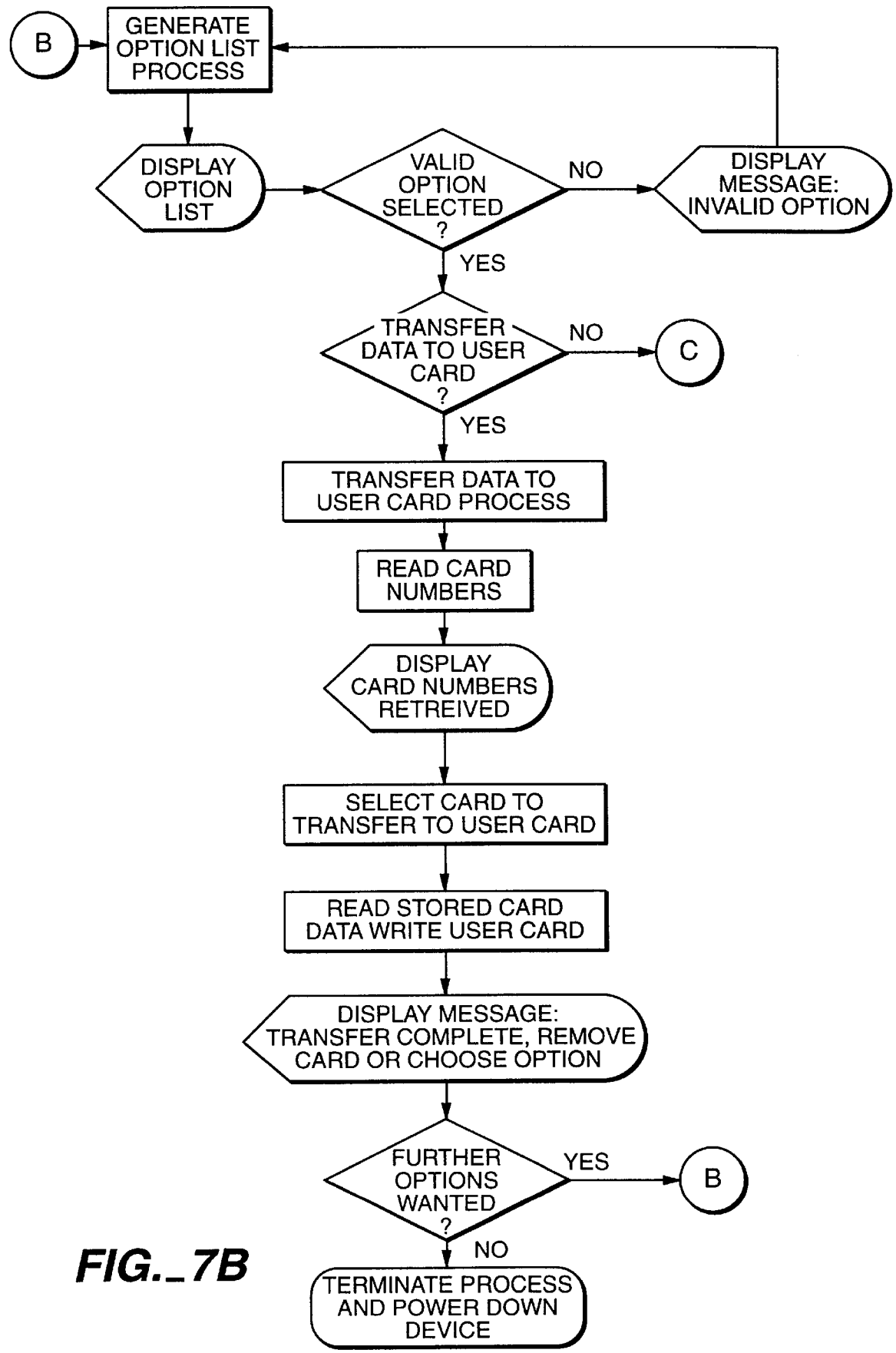
FIG._7B

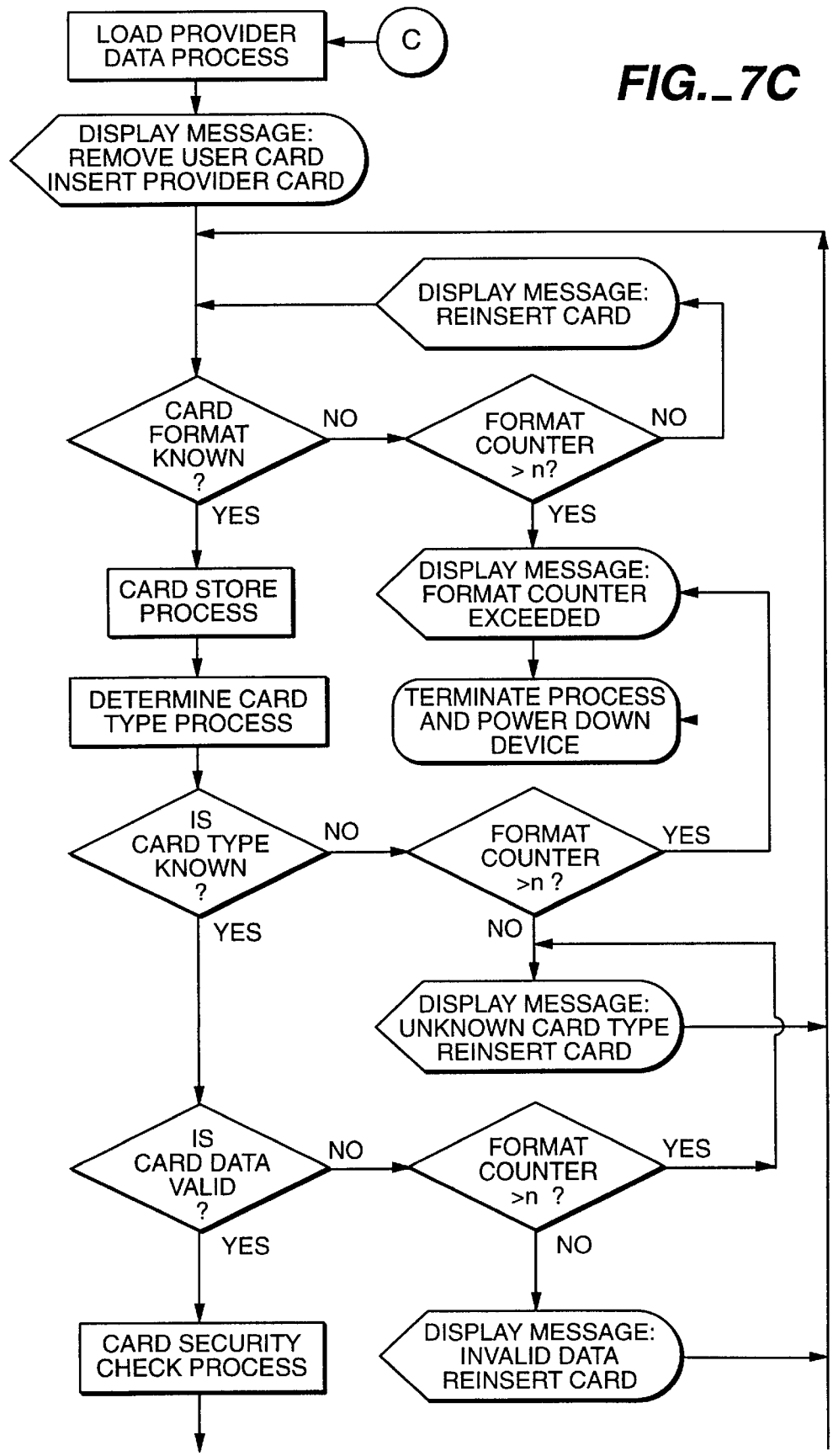
FIG._7C

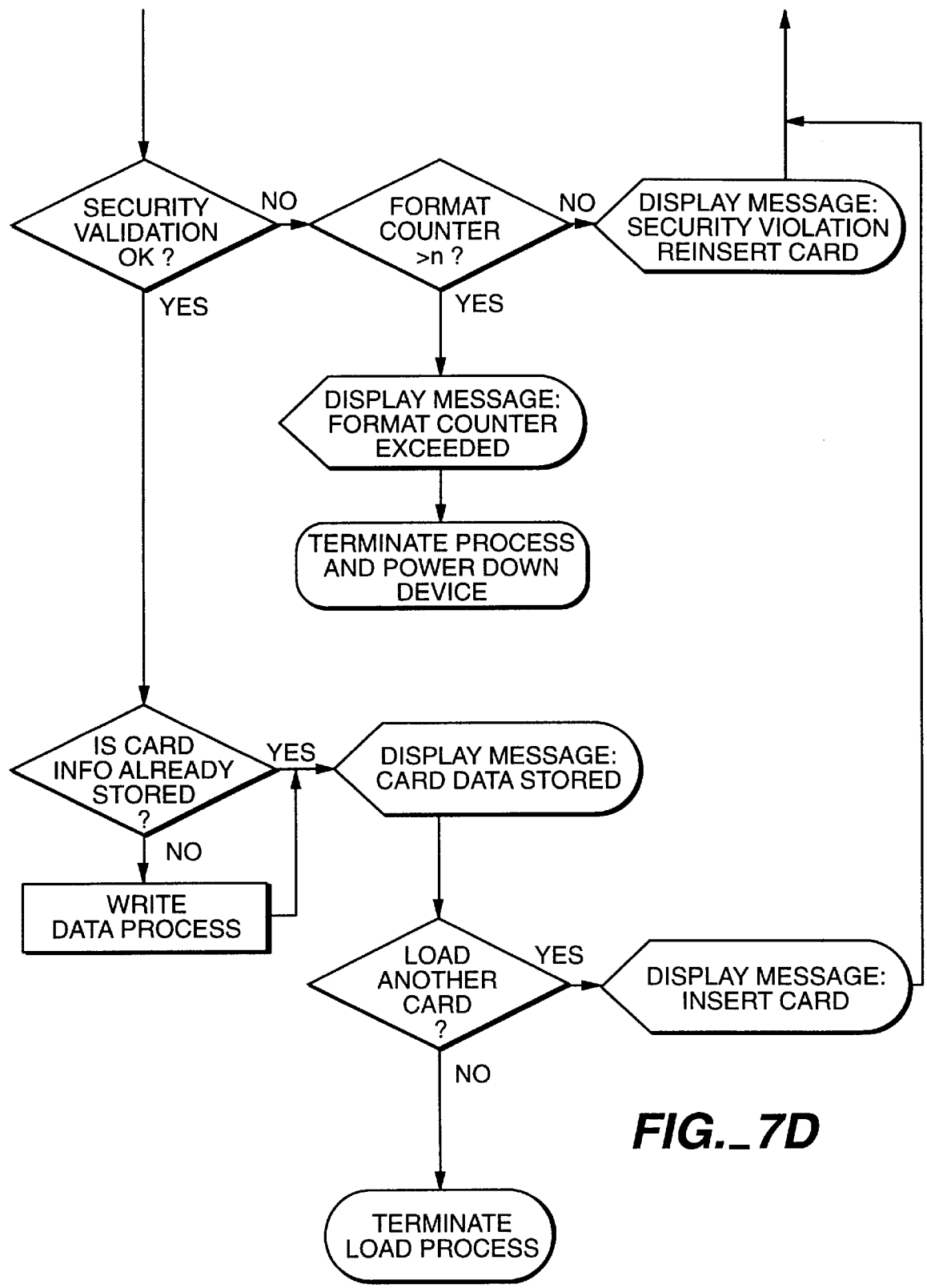
FIG._7D

MULTIPLE CARD DATA SYSTEM HAVING FIRST AND SECOND MEMORY ELEMENTS INCLUDING MAGNETIC STRIP AND FINGERPRINTS SCANNING MEANS

BACKGROUND OF THE INVENTION

1. Field of the Invention

This invention relates to data cards and, in particular, to a multiple card data system allowing a single data card to be substituted for multiple proprietary data cards. This invention also relates to an intelligent device and system for modifying, a single data card to make it the temporary functional equivalent of one of a multiple of proprietary data cards. Particular aspects of the invention relate specifically to storage of information on data cards and to data card readers.

2. Description of the Related Art

Data cards have become a ubiquitous and vital part of modern commerce and society. Data cards include financial cards such as credit cards, ATM cards, telephone calling debit cards, and other cards containing data used for financial transactions. Financial cards have been issued for customer use by oil companies, department and chain stores, (grocery stores, video rental chains, airlines and many other large and small businesses. Data cards also have been issued in increasing numbers to carry non-financial data. These include drivers' licenses, security cards, health insurance cards, automobile insurance cards, club membership cards, and library cards.

The astounding success of data cards and the ease with which they may be produced and issued has burgeoned the number of data cards held by the average individual. It is expected that the use of data cards will sharply rise to over 5 billion cards by the year 2000. For many, it is not possible conveniently to carry all the data cards which have been issued, leading data cards of lower priority to become scattered or lost. A card used infrequently may not be available when needed. Simple management issues attending an inventory of many data cards, such as when to destroy old data cards, can become an annoyance and data cards become clutter instead of serving a useful function.

Issuers of "general purpose" credit cards, such as those issued by VISA, MasterCard, and American Express, have persuaded many businesses to accept the general purpose card in addition to the credit card issued by the individual businesses. It is unclear whether the general purpose credit cards have decreased the number of data cards in circulation or have merely added another data card to the existing array.

Data cards most frequently are issued with the data thereon stored on magnetic strips. Advances in microelectronics have made it possible to embed in a standard sized credit card a chip capable of processing and storing a vastly greater amount of information than previously possible with magnetic strip technology. These so-called "smart cards" hold immense promise. For example, it is anticipated that a person's medical history may be stored on a smart card for instant retrieval as needed. Nevertheless, smart cards are not yet in wide use, are expensive relative to magnetic strip cards, and require a different card reader. On the other hand, because of their intelligence smart cards are better able to protect the data stored on them than magnetic strip cards and have a considerably longer lifespan.

Data cards generally present a number of vexing security problems. Data card security is commonly based on use of a PIN code known only to the card owner. If the data card is stolen, it is useless without the PIN code. Unfortunately, people frequently write their PIN code on the back of their data card or on a piece of paper carried in the same wallet or purse as the data card, thereby frustrating the security of the card.

Further security problems are presented by the ease with which magnetic strips on data cards are copied. Copying allows the data stored on the magnetic strip to be transferred to another data card having different identifying indicia. If the copier also possesses the PIN code for the copied data, the copier can use the copied card as would the proper owner.

Even if the PIN code is not written down for the convenience of the wrongdoer, PIN codes may be obtained by one with sufficient skills and determination. PIN codes therefore act more as a filter than an impassable barrier, keeping out most, but not all, from access to the protected data.

Smart cards present additional and unique security issues. A great deal information can be stored on the electronic memory of a smart card. However, as with any computer, the information on a smart card becomes accessible every time it interfaces with another computer. It may be that the electronic thief must contend with security walls built into the smart card such as increasingly effective encryption techniques, but persons with a sufficiently sophisticated level of knowledge may be able to breach the barriers In this sense, smart cards present an opportunity for data theft on a scale greater than existed before them.

While the memory in smart cards is large enough to hold the data of a number of service providers, e.g., VISA, MasterCard, American Express, smart cards have not yet been commercially developed to carry the services of more than one service provider. I his is probably due to a number of security problems. First, it has not been established how the conflicting security measures built into each service provider's data are to be resolved with numerous service providers' data being resident in a single smart card memory. This is an issue of to what extent the owner of a smart card may have powers in the smart card data hierarchy over or inconsistent with the security measures inherent in other service providers' data lower in the hierarchy It is assumed that multiple providers will have to reach some agreement regarding how security for each of the providers is to be handled. Given each individual provider's proprietary interest in maintaining ultimate control over that provider's information, such agreement seems unlikely.

Second, it may be essential to the success of smart cards to allow them to be remotely provisioned. This is inconsistent with the practice in the case of magnetic strip cards of requiring the data card holder to have a service installed only by bringing the card to the service provider. It is also inconsistent with requiring the surrender of the smart card when one of the services on the smart card is to be canceled. If the holder of the data card retains possession of the card, the provider's control of the information on the card becomes an issue.

Third, assuming the card is able to be remotely provisioned, the issue remains of how to reuse space in the holder's smart card as old services are canceled and new services are installed.

Fourth, there exists a commercial conflict between competitive services, some of which desire to restrict access by their customers to competing services.

Each of the above security issues is presented by the data of multiple service providers or issuers being resident in the single memory of a smart card. See Mandelbaum, U.S. Pat. No. 5,544,246.

Having multiple providers' data all accessible at once on a single card may also present antitrust issues depending on the level of cooperation between the providers Magnetic strips on data cards are composed of microscopic ferromagnetic particles each of which acts like a tiny bar magnet. These particles are rigidly held in place by a resin binder. In the manufacturing process the magnetic particles are aligned with their north-south axes parallel to the longitudinal axis of the magnetic strip until the binder hardens. In this state the magnetic strip is effectively "unencoded." The magnetic strip is "encoded" by application of a strong localized magnetic force which changes the polarity of the particles in the magnetic strip to create a series of magnetic signatures. The series of magnetic signatures can be detected by a reader and converted into alphanumeric characters.

In a typical application, once a magnetic strip is read, the information is transmitted to a computer which must recognize the encoded data. The data encoded on the entire magnetic strip must be present for a computer to make sense of the data. A common experience is to have the magnetic strip "corrupted" by wear and tear or from proximity to a magnetic field which erases the data. For example, when the magnetic strips on two provider cards are brought into contact with each other, the magnetic field on each card can be destroyed, erasing the data. Once any portion of the magnetic strip is corrupted, the data card is unusable unless it can be again encoded.

The data on data cards must be read by a card reader. To read the data on a magnetic strip, the strip must be moved over a reader "head". One type of reader moves the card over a reader head. Another type of reader requires that the card be manually "swiped" past a reader head. In both types of readers, the head is stationary.

Both kinds of readers require a geographical coordination between the placement of the magnetic strip on the card and the location of the head on the reader. If the magnetic strip is in the wrong location, the head cannot read the strip. Hence, the existing card readers restrict the magnetic strip on data cards to readable locations. Further, any data card containing two magnetic strips would have to be read twice, the card being reinserted into the reader for reading of the second strip after having read the first strip.

Existing card readers are also too bulky to lend themselves to application in a miniaturized environment.

The value of identification using fingerprints is well understood. Recent technological advances now make it possible to "image" a fingerprint for comparison against a data bank for verification of identity. An image of an individual's fingertip is captured by a scanners transformed into a stream of digital information, then examined to ensure its quality. The unique features in the finger insane are extracted and used to compute a distinct finger-image identifier record. The finger-image identifier record is then compared with a record stored in a memory bank. A match verifies that the individual is the person authorized for the subject use, access or right.

Until recently the equipment needed to read and interpret finger images was too large to be portable. However, advances in microelectronics now allow the miniaturization of the component parts necessary for high quality imaging. Even so, in the most common application, access must be had to a fingerprint database for verification of identity. For example, NEC has introduced a "Remote Access Positive Identification- raPID" fingerprint system which provides on-site fingerprint scanning and matching using a palm sized unit. Record information captured with the raPID unit is sent via radio to a central database for comparison. Thus, for verification of an individual using a fingerprint image, the mechanics of having access to a database of fingerprint images must be resolved.

It has been posited that there may be insufficient public acceptance to fingerprint imaging as a form of identity verification because of the public's association of fingerprints with the criminal justice system. It may be that this problem is more acute when verification is dependent upon comparison of the individual's fingerprint to a remote and impersonal database.

To the extent that keying information is an integral part of using data cards, this presents a significant disadvantage to persons with disabilities such as blindness, paralysis or dexterity problems. Voice recognition technology has advanced to the point where small devices can have incorporated in them the ability to receive and act on verbal commands.

SUMMARY OF THE INVENTION

A multiple data card system according(, to the invention takes advantage of current technological advances to resolve many of the above problems. The invention allows the user to carry a single card which may be modified at will to be in effect a clone for any one of the user's provider data cards, while allowing the existing industry infrastructure for data card transactions to remain unchanged. The card carries only data for one provider at a time, eliminating the problems inherent with carrying data for multiple providers on a single data card.

A multiple data card system comprises a user card and a portable data management device. The user card includes a first memory for storing data issued by a service provider. This could be a magnetic strip or a microelectronic chip. In the case of a magnetic strip, it would conform to existing industry standards regarding placement of the strip on the card, thus not requiring vendors and others performing, data card transactions to acquire modified equipment. The user card also includes a second memory for storing, a set of data unique to the user. This too could be a magnetic strip or a microelectronic chip. The second memory is spaced apart and totally separate from the first memory so as to make it impossible to be read with the first memory. The data set unique to the user may include any indicia desired for identification of the user consistent with the level of security needed. For instance, for a high level of security the indicia could include the name of the user and a number randomly (venerated by the device and copied onto the second memory each time the user card is inserted into the device.

The data management device has an apparatus for automatically activating the device upon insertion of the user card or a provider's card into a slot in the device with the user card inserted into the data management device and the device activated, the device reads the unique user data set on the second memory. The device compares the unique user data on the second memory with information stored in the device's memory. If the second memory is an intelligent electronic chip, the communication between the data management device and the user card may employ encryption techniques to maximize validity, of the identity verification process. See, e.g,. approaches described in Mandelbaum, U.S. Pat. No. 5,544,426, and Pavlov, U.S. Pat. No. 4,614, 861. If there is a match, the device activates a fingerprint scanner and directs the user to place the user's finger over the device's fingerprint scanner. The scanner images the fingerprint and compares the fingerprint image obtained with a record stored ill the device's memory. If the comparison is favorable, the device provides access to the higher functions of the device directed to manipulation of provider card data on the user card.

The method of identification of the user described above solves or simplifies a number of security problems. First, it eliminates the need for memorization of a PIN code because the fingerprint provides a unique identifier superior to the P)IN code. The fingerprint cannot be lost or stolen, unlike the PIN code. It is also unlikely to be left in a wallet or purse.

Second, if the unique user data is stored on a chip on the user card, advantage can be taken of encryption technology to enhance the validity of the identification process. Since all the communication is between the user card and the data management device, both in the possession of the user, the danger of the communication being intercepted and decoded is greatly minimized.

Third, it combines two different identification procedures, i.e., first, the data comparison on the user card with that on the data management device, and second, the finge-print imaging. This results in a dramatic improvement in the validity and security of the process of identification of the user. Supposing an unauthorized person obtains both the data management device and the user card and inserts the user card into the data management device, all the user card does is provide access to the fingerprint scan function. Absent the fingerprint an unauthorized holder of the user card cannot gain access to the data management device's higher functions. Conversely, the data management device is useless without the proper user card and the authorized user. The wrong user card will not provide access to the fingerprint scan function because the correct user data unique to the user will not be available. Therefore, if the data management device is stolen, it will not function without the proper user card. The higher functions of the device only become accessible for the authorized user having the proper user card.

Fourth, users of the invention will likely not have the same negative reaction to fingerprint imaging because the fingerprint is merely being compared to a record of the user's fingerprint stored in the device rather than being compared to an impersonal, and probably remote, database.

Once the identity of the user has been verified, the data management device provides several options. The user may insert a provider card into the device so that the data on its magnetic strip or chip may be read. A copy of the provider's data on the provider card can be stored in the device's memory. In this way, copies of the data contained on numerous provider cards may be stored in the device's memory. For example, the user- may store provider card data in the data management device's memory from data cards provided to the user by VISA, Macy's, an automobile emergency road service provider, and a membership club, and information contained on a drivers license, a security access card, a library card and a health insurance provider membership card. Local provisioning of the data management device removes the need for and problems associated with remote provisioning. The data management device can be provisioned simply upon issuance by a provider of a new data card. There is no competition for space on the user card because providers take turns having their data resident on the card as elected by the user. Commercial conflict between providers becomes less of a concern as no agreement is necessary to allow the data of multiple providers to be store on the data management device because multiple sets of provider data are not being provided for simultaneous access to the other party during a transaction.

Another option is to copy the data from a selected provider onto the user card. In the case of a magnetic strip, since the strip is positioned in compliance with industry standards, the user card, with the chosen provider's data copied onto it, may be used as a virtual clone for the provider supplied data card. The user may overwrite the data on the user card with any selected provider data stored in the data management device The user card effectively becomes a secure substitute for all the data cards of the user's providers. Since the data from only one provider at a time may be loaded onto the magnetic strip on the user card, there is no need to resolve competing security concerns between multiple data providers. Presentation of the user card during a transaction presents only the data of the one selected provider and only the security method of that provider to the interface device.

In a preferred embodiment of the invention the user card includes a magnetic strip on which the provider data is to be stored. A rechargeable power cell is embedded in the user card and is connected to an electromagnet which is overlapped by the magnetic strip. When the user card is inserted in the data management device, the power cell is charged. A microelectronic chip embedded in the user card directs the power cell to release its energy to the electromagnet a few minutes, e.g., five minutes, after the user card is removed from the data management device. The electromagnet creates a magnetic field which erases the data stored on that portion of the magnetic strip overlapping the electromagnet, making the magnetic strip unreadable. An additional security feature is thus provided making the magnetic strip on the user card unreadable after a few minutes. Further, even if the magnetic strip is copied, the copy is unreadable and useless.

A primary object of the invention is to provide a multiple application data card system allowing a single user data card to be substituted for multiple proprietary data cards A further object of the invention is to provide a multiple application data card system which is portable and compact.

Another object of the invention is to provide a multiple application data card system having a user data card including a memory for storage of a data set unique to the user for identification of the user.

A further object of the invention is to provide a user data card including a memory for storage of a data set unique to the user having a placement on the user data card which does not allow it to be read by a standard data card reader.

A yet further object of the invention is to provide a multiple application data card system having increased security by means of a user identification process including the serial steps of first, comparing a unique data set on a user card with data stored in a data management device to find a match, and second, imaging of the user's fingerprint.

An additional object of the invention is to provide a multiple application data card system which avoids the problems inherent with having(, the proprietary information of multiple service providers resident in the single memory of a smart card, by providing, a system allowing a user card to carry the data for only one provider at a time allowing the user card to act in place of the provider card of an elected provider.

A still further object of the invention is to provide a multiple application data card system capable of writing any one of a plurality of provider data sets on a user data card multiple times for conducting transactions using the user card as a Substitute for any one of a plurality of provider data cards.

Another object of the invention is to provide a user card having, an electromagnet which when energized erases data from a portion of a magnetic strip overlapping the electromagnet thus rendering the data on the magnetic strip unreadable until reencoded.

A different object of the invention is to provide a data card reader capable of simultaneously reading two magnetic strips on a stationary data card Another object of the invention is to avoid the problems in the prior art presented by remote provisioning of smart cards and multiple application data cards by providing, a multiple data card system containing data from multiple data providers which can be updated directly from providers' data cards.

A further object of the invention is to provide a multiple data card system containing voice recognition capacity.

BRIEF DESCRIPTION OF THE DRAWINGS

FIG. 1 is a schematic block diagram of the data management device of a multiple application data card system according to the invention showing component parts of the data management device.

FIG. 2a is a front view of a user card according to the invention.

FIG. 2b is a rear view of the user card depicted in FIG. 2a showing two magnetic strips disposed on the card.

FIG. 3a is a front view of a user card according to the invention showing, a microelectronic chip embedded in the card.

FIG. 3b is a rear view of the user card depicted in FIG. 3a showing a single magnetic strip disposed on the card.

FIG. 4a is a plan view of a data management device of a multiple application card according to the invention.

FIG. 4b is an end view of the data management device depicted in FIG. 4a showing a slot for insertion into the device of a user card.

FIG. 4c is a plan view of the data management device depicted in FIG. 4a showing a user card inserted into the device.

FIG. 5a is a plan view of a card reader according to the invention including a user card disposed adjacent the reader.

FIG. 5b is a side view of the card reader illustrated in FIG. 5a.

FIGS. 6 and 7 are schematic flow diagrams illustrating the operation of the data management device according to the invention.

FIG. 8a is a plan view of a user card according to the invention including two magnetic strips, a chargeable power cell compartment, an electromagnet, and a microelectronic chip.

FIG. 8b is a side view of a portion of the user card depicted in FIG. 8a taken along lines 8a showing the magnetic strip overlapping the electromagnet embedded in the card.

FIG. 8c is an edge view of a portion of the user card depicted in FIG. 8a taken along lines 8a showing the magnetic strip overlapping the electromagnet embedded in the card.

DESCRIPTION OF THE PREFERRED EMBODIMENTS

FIG. 1 shows a schematic representation of a data management device in accordance with the invention. The device includes electronic memory capacity and a microprocessor for operation of the functions of the device. A fingerprint scanner is provided for imaging a fingerprint to identify the device user. A card reader/writer is provided for reading data on data cards, such as credit cards, and for writing data on a user card inserted in the device. A display and key pad are provided to operate the device. In the preferred embodiment, each of these component parts is sufficiently miniaturized for the device to be small enough to be carried in a pocket or purse.

A user card 10 in the preferred embodiment is depicted in FIGS. 2a and 2b. The front of the card resembles a standard credit card and carries identifying indicia such as the user's name and a tracking number. The rear of the card shown in FIG. 2b shows a first magnetic strip 12 for storage of data supplied by providers. A second magnetic strip 14 is spaced from the first magnetic strip 12 and is provided for storage of a set of data unique to the card user. This data could include the user's name, the card expiration date, the user's birthdate and social security number, and a permanently resident unique user alphanumeric or a randomly venerated number copied onto the strip with each use of the card.

Another embodiment of a user card is depicted in FIGS. 3a and 3b. FIG. 3a shows the front of the user card 16 with an electronic chip 18 embedded in the card for storage of a set of data unique to the card user. The back of the user card 16 is shown in FIG. 3b. The card 16 includes a magnetic strip 20 for storage of provider data. Another embodiment of the user card not illustrated is a smart card having, electronic memory or storage of the unique user data and data from a provider.

The preferred form of the data management device 22 is shown in FIG. 4a. A slot 24 in the device 22 is for insertion of the user card 10. The device 22 includes a display 26 and keypad 28 for its control and operation. A fingerprint scanner 30 is included for imaging of a fingerprint for identification of the user. In another embodiment, the device 22 also includes a voice recognition module, not illustrated, for voice responsive control of the device 22. A speaker is supplied in another embodiment not illustrated for audible feedback and commands. Also not illustrated are light sets provided for visual confirmation of activities or problems.

Referring to FIG. 4c, in normal operation a data card will be inserted into the slot 24 to activate the device 22. Activation is accomplished with a mechanical switch or electronically with a sensor not illustrated. Once the device 22 is activated, it will immediately read the data card.

FIGS. 5a and 5b show a preferred embodiment of a card reader 34 capable of reading a standard type provider card or a user card 10 having two magnetic strips. The card reader 34 has a motor 36 which is anchored to the interior of the device 22 via screws or another suitable method such as glue. The motor 36 controls a drive shaft 40 having pulleys 42 attached on each end. Each end of the drive shaft 40 is supported by a bearing 44. On each pulley 42 rides a cord 46, chain or cable, running to a second set of pulleys 48 on the ends of a cooperating shaft 50. The cooperating shaft 50 is supported by bearings 52. Between and parallel to the drive shaft 40 and the cooperating shaft 50 is disposed a cross bar 54. The cross bar 54 is attached to cords 46 at keepers 56 and 58. Read/write head 60 and read head 62 are attached to the cross bar 54. First head 60 is positioned to read the first magnetic strip 12 on the user card 10 or a magnetic strip on a provider card. Second head 62 is positioned to read the second magnetic strip 14 on the user card 10. In another embodiment of the invention, second head 62 is a read/write head for writing data on as well as reading of the second magnetic strip 14. A lug 64 is attached to one end of the cross bar 54. One end of a spring 66 is attached to the lug 64. The spring 66 is tensioned around an idler pulley 68 and the other end 70 of the spring 66 is attached to a base surface near the cooperating shaft 50. Activation of the motor 36 spins the drive shaft 40 and pulleys 42, setting in motion the cords 46 to drive the cross bar 54 in the direction of the cooperating shaft 50. Driving the cross bar 54 in the direction of the cooperating shaft 50 lengthens and tenses the spring 66. The cross bar 54 moves parallel to the drive shaft 40 and the cooperating shaft 50 towards the latter until the lug 64 hits switch 72 which cuts power to the motor 36. The spring 66 then returns the cross bar 54 to its home position near the drive shaft where it hits reset switch 74 which resets the motor 36 for its next activation.

An alternative embodiment of a two strip reader as shown in FIG. 9 is not motorized. Guide members 76 each provide opposing rails 78. Movement of the cross bar 80 is accomplished manually by moving knob 82. The cross bar 80 is held normal to guide members 76 by dual track members 84 on each end of the cross bar 80. Movement of the knob 82 slides read or read/write heads across magnetic strips on a data card.

In an alternate embodiment of the invention, the second magnetic strip 14, although spaced and separate from the first magnetic strip 12, is not disposed symmetrically opposite the first magnetic strip 12 relative to the longitudinal axis of the user card 10. The nonsymmetric placement of the second magnetic strip 14 makes it impossible for the second magnetic strip 14 to be read by the first read/write head 60 if the wrong end of the user card 10 is inserted such that the magnetic strips are disposed in reverse positions relative to the reader heads.

In another embodiment of the invention the device 22 includes an insertion slot to receive only the user card 10 and a separate swiping slot, not illustrated, for provider cards. A reader, also not illustrated, inside the device 22 is provided to read the unique user data set on the second magnetic strip on the user card. The provider cards are read by a stationary head located in the swiping slot. In a related alternative embodiment, the unique user data set is stored on an electronic chip on the user card 10. Reading of the user data is accomplished with either a contact or contactless chip reader disposed within the device 22.

Referring generally to FIG. 6, when a data card is inserted, the Invoke Card Reader Process is initiated whereby the card reader 34 reads the data card and determines if the card has one strip or two. In the preferred embodiment, heads 60 and 62 read only in one direction. This prevents a data card from being read unless inserted properly. Similarly, if the user card is inserted backwards, the first head 60 cannot read the second magnetic strip 14 because of the nonsymmetrical disposition of the second magnetic strip 14. If the card has only one strip, a Nonuser Card message is displayed indicating that the card inserted is not a user card. Hence, if the data card is a provider card, or any card other than user card I 0, such as another person's user card, the device 22 rejects the card and displays the non-user card message to reinsert the card. If a card having only one strip is inserted into the device 22 more than a preprogrammed number of times, a format counter will be triggered, the display will show that the number of attempted card insertions has been exceeded, and the device will terminate and be inoperable for a preprogrammed amount of time. If the card does not have two strips, a message is displayed directing the user to re-insert the card. If a card having more than two strips is inserted into the device 22 more than a preprogrammed number of times, a format counter- will be triggered, the display will show that the number of attempted card insertions has been exceeded, and the device will terminate and be inoperable for a preprogrammed amount of time. If the card has two strips, a Validate User Card Process is initiated.

Referring generally to FIG. 7, the card reader 34 determines it the user card is the correct user's card 10 by reading the data on the second magnetic strip 14. If the security identification data on the second magnetic strip 14 does not match the identification data stored in the memory of the device 22, a message is displayed indicating an Invalid Card, and the device is powered down for a preprogrammed amount of time. If the security data on the card and on the device match, a Fingerprint Scan Process is initiated.

A message is displayed directing the user to place the user's finger on the scanner 30. The user's fingerprint is then placed on the fingerprint scanner 30. The device 22 then determines if the fingerprint image obtained by the scanner 30 matches an electronic representation of the user's fingerprint stored in the device 22. If there is no match, the device loops back through the Fingerprint Scan Process. If a match is not obtained after a predetermined number of tries, a message is displayed indicating, an invalid fingerprint scan, the Fingerprint Scan Process is terminated and the device is powered down for a preprogrammed amount of time. If a fingerprint match is obtained, the higher functions of the device 22 become accessible and a Generate Option List Process is initiated which displays a list of options.

The user may then choose an option. If the user chooses an invalid option, an invalid option message is displayed and the device 22 loops back through the Display Option List Process. If the user declines to transfer data to the user card and chooses to load information from a provider card into the device 22, a Load Provide Data Process is initiated. A message is displayed directing the user to remove the user card 10 and insert a provider card. In an alternative embodiment a swiping slot is supplied for provider cards in addition to an insertion slot for the user card 10. Once the Load Provider Data Process at FIG. 7C is initiated, a message is displayed to simply swipe a provider card rather than to remove the user card and insert a provider card. In either embodiment, inquiry is then made whether the card format is known. If the card format is not known, a message is displayed directing the user to reinsert the card. If the card format is not known after a predetermined number of tries, a Format Counter Exceeded message is displayed, the process is terminated and the device 22 is powered down for a preprogrammed amount of time.

If the card format is known, a Determine Card Type Process is initiated. A check is made to determine if the provider card type is known. If the provider card type is not known, an Unknown Card Type-Reinsert Card message is displayed directing the user to reinsert the card. If it is successively determined a preprogrammed number of times that the provider card or cards inserted do not have a known format, a format counter is triggered, the process is terminated, and the device 22 is powered down and becomes inoperable for a preprogrammed amount of time.

If the card type is known, the device 22 determines if the card data is valid. The validity check determines if the card expiration date is earlier than the current date. There could also be a validity check of a service code on the card having a known fixed value. If the card data is not valid, a message is displayed indicating Invalid Data - Reinsert Card. If it is successively determined a preprogrammed number of times that the provider card or cards inserted have invalid data, a format counter is triggered, the process is terminated, and the device 22 is powered down and becomes inoperable for a preprogrammed amount of time. If the card data is determined to be valid, a Card Security Check Process is initiated.

A security check is made. If it is determined that a security violation has occurred, a Security Violation - Reinsert Card message is displayed. If it is successively determined a preprogrammed number of times that a security violation has occurred, a format counter is triggered, the process is terminated, and the device 22 is powered down and becomes inoperable for a preprogrammed amount of time. If the card passes the security check, it is next determined if the card data is already stored on the device 22.

If the card data is already stored in the device, a message is displayed indicating that the card data is already stored. The Load Provider Data Process may then either be terminated or another provider card may be reinserted into the device 22. If the card data has not been stored on the device 22, a Write Data Process is initiated which copies the provider data from the provider card and loads the copy in the device's 22 memory. The user is then given the options of loading data from another provider card or powering down the device 22. After all the data from selected provider cards has been stored hi the device 22, the user must either power down the device 22 or it automatically powers down if not in use for a preprogrammed amount of time. After the device 22 has been powered down for a preprogrammed amount of time, it may be restarted by insertion of the user card 10.

If, as an option, the user chooses to upload prestored provider card data from the device 22 onto the first magnetic strip 12 of the user card 10, the device 22 reads the provider card identification numbers and displays the names of the providers for which provider data card identification numbers were retrieved. A provider card is selected initiating a Read Stored Card Data and Write Process. The data stored in the device 22, representing a copy of the data on the provider's data card, is uploaded to the first magnetic strip 12 of the user card 10. The user may then remove the user card in which case the process is terminated and the device 22 is powered down, or choose another option. If any data card, be it the user card 10 or a provider card is left in the device 22 for more than a preprogrammed amount of time, the device 22 will be powered down and must be restarted by reinserting the user card 10.

Once data from a provider's data card is uploaded to the first magnetic strip 12 of the user card 10, the user card 10 can be used as a clone of the selected provider card. However, it can be so used only for a limited time. As shown in FIG. 8, in the preferred embodiment the user card 10 includes a power cell 76 embedded in the card 10. The power cell 76 is charged while resident in the device 22 through a positive contact 78 and a negative contact 80. An electromagnet 82 is connected to the power cell 76. A portion of the first magnetic strip 12 overlays the electromagnet 82. Upon the expiration of a preselected segment of time after the user card 10 is removed from the device 22, an intelligent microelectronic chip 84, which is electrically connected to the power cell 76, directs the power cell 76 to energize the electromagnet 82 causing it to create a magnetic field. The magnetic field brings that portion of the first magnetic strip 12 overlapping the electromagnet 82 within the magnetic field and erases the magnetic data on the overlapping portion. The entire magnetic strip 12 becomes unreadable, and therefore useless, when the data in the overlapping portion of the magnetic strip 12 is erased.

There have thus been described certain preferred embodiments of a multiple application data card system. While preferred embodiments have been described and disclosed, it will be recognized by those with skill in the art that modifications are within the true spirit and scope of the invention. The appended claims are intended to cover all such modifications.

I claim:

1. A multiple card data system comprising
   a user card having
      first memory means for storing rerecordable machine-readable provider data, and
      second memory means for storing a machine-readable data set unique to a user, said second memory means spaced from said first memory means, and
   a data management device having
      means for reading provider data on said first memory means on said user card and said unique user data set on said second memory means on said user card,
      storage means for storing comparison data related to said unique user data set on said second memory means on said user card,
      comparison means for comparing said unique user data set on said second memory means on said user card with said comparison data on said storage means to generate an authentication signal upon favorable comparison of said unique user data set on said second memory means with said comparison data on said storage means,
      sensor means for scanning fingerprints to generate an electronic representation of a scanned fingerprint,
      means for activating said sensor means in response to generation of said authentication signal by said comparison means,
      fingerprint memory means for storing an electronic digital representation of a user's fingerprint,
      means for comparing the electronic representation of a scanned fingerprint with the electronic digital representation of a user's fingerprint to venerate a validation signal upon favorable comparison of the electronic representation of a scanned fingerprint with the electronic digital representation of a user's fingerprint, and
      a provider data set retrieval system comprising,
         means for activating said provider data set retrieval system in response to generation of said validation signal,
         means for reading a provider data set contained on a provider data card,
         data set memory means for storing a plurality of provider data sets, and
         means for writing a duplicate of a provider data set from a provider data card on said first memory means on said user card.

2. The card data system of claim 1 wherein said second memory means on said user card is a magnetic strip.

3. The card data system of claim 1 wherein said second memory means on said user card includes microelectronic circuitry.

4. The card data system of claim 1 including means for writing machine-readable data on said second memory means on said user card.

5. The card data system of claim 1 wherein
said user card includes
- a rechargeable power cell embedded in said user card,
- an electromagnet embedded in said user card electrically connected to said power cell, and
- means embedded in said user card for directing said power cell to energize said electromagnet to create a magnetic field,
- said card data system includes means for charging said power cell,
- said first memory means of said user card is a magnetic strip, and
- a portion of said magnetic strip overlays a portion of said electromagnet so that, upon creation of a magnetic field by said electromagnet, previously encoded data in said overlaying portion of said magnetic strip is erased.

6. The card data system of claim 5 wherein
said means for directing said power cell to energize said electromagnet is a microelectronic chip.

7. The card data system of claim 1 wherein
said user card includes a machine-readable representation of a fingerprint,
said data management device includes means for reading said representation of a fingerprint on said user card to generate an electronic expression of said fingerprint representation, and
said data management device further includes means for comparing the electronic expression of said fingerprint representation with said electronic digital representation of a user's fingerprint in said memory means to generate a validation signal upon favorable comparison of said fingerprint representation on said user card with said electronic digital representation in said memory means.

8. The card data system of claim 1 wherein
said data management device has a slot sized to receive freely said user card,
said data management device includes means for stationary disposition of said user card in said interior slot of said data management device, and
said means for reading provider data on said first memory means on said user card and said unique user data set on said second memory means on said user card includes means for simultaneously reading provider data on said first memory means on said user card and said unique user data set on said second memory means on a user card stationarily disposed in said interior slot.

9. The card data system of claim 8 wherein
said means for simultaneously reading said provider data on said first memory means on said user card and said unique user data set on said second memory means on said user card comprises
- a motor anchored to said data management device,
- a rotatable drive shaft controlled by said motor, said drive shaft having, two opposing ends and a first pair of pulleys attached one to each said end,
- a rotatable cooperating shaft disposed parallel to said drive shaft anchored to said data management device, said cooperating shaft spaced from said drive shaft substantially at least the length of a magnetic strip on a data card, said cooperating shaft further having two opposing ends and a second pair of pulleys attached one to each said end,
- flexible means running between said first pair of pulleys and said second pair of pulleys for simultaneous rotation of said second pair of pulleys upon rotation of said first pair of pulleys,
- a cross bar disposed parallel to said drive shaft attached to said flexible means and moveable between and parallel to said drive shaft and said cooperating shaft, said cross bar having a first reading means for reading said first memory means and a second reading means for reading said second memory means on said user card,
- a spring having a first end attached to said cross bar biasing said cross bar towards said drive shaft, movement of said cross bar towards said cooperating shaft tensioning said spring,
- means for activating said motor for movement of said cross bar towards said cooperating shaft, and
- means for cutting power to said motor when said cross bar moves near said cooperating shaft so that said spring returns said cross bar to a position adjacent said drive shaft.

10. The card data system of claim 9 wherein
said first reading means includes writing means for writing on said first memory means on said user card.

11. The card data system of claim 10 wherein
said second reading means includes writing means for writing on said second memory means on said user card.

12. The card data system of claim 8 wherein
said means for simultaneously reading said provider data on said first memory means on said user card and said unique user data set on said second memory means on said user card comprises
- a rigid framework having a first guide member and a second guide member parallel to said first guide member,
- each said guide member having a longitudinal slot,
- a cross bar having a first end and a second end, said first end of said cross bar slidingly disposed within said slot of said first guide member, said second end of said cross bar slidingly disposed within said slot of said second guide member, said first end of said cross bar further having a knob located outside of said slot of said first guide member,
- means for holding said cross bar slidingly normal to said guide members,
- said cross bar having a first head means for reading the first magnetic strip and a second head means for reading the second magnetic strip,
- said cross bar movable between a first position and a second position spaced from said first position substantially at least the length of a magnetic strip on a data card.

13. The card data system of claim 1 wherein
said user card has power cell means for holding a charge of power to store machine-readable provider data for a limited time until said power cell means loses its charge.

14. The card data system of claim 13 wherein
said first memory means on said user card includes a powered portion energized by said power cell means such that said powered portion stores machine-readable data for a limited time until no longer energized.

15. The card data system of claim 1 wherein
said data management device has a slot sized to receive freely said user card, and
said data management device includes means for activation of said data management device upon insertion of said user card into said slot.

16. The card data system of claim 15 wherein
said slot has an opening and a distal end opposite said opening, and
said means for activation of said data management device is disposed adjacent said distal end of said slot.

17. The card data system of claim 1 including
display means for displaying visually readable indicia.

18. The card data system of claim 1 including
input means for controlling said data management device.

19. The card data system of claim 1 wherein
said data management device includes
   means for emitting audible sound in response to an audio input signal, and
   means for generating an audio input signal in response to operation of said input means.

20. The card data system of claim 1 wherein
said data management device includes voice recognition means for recognizing verbal comm ands to control said data management device.

21. The multiple card data system of claim 1 wherein:
said first memory means includes power cell means for holding a charge of power to store machine-readable data for a limited time until said power cell means loses its charge.

22. The erasable data card of claim 21 wherein
said power cell means includes a powered portion energized by said power cell means such that said powered portion stores machine-readable data for a limited time until no longer energized.

23. The erasable data card of claim 22 wherein
said memory means comprises a magnetic strip.

24. A multiple card data system comprising
a user card having
   a magnetic strip for storing machine-readable provider data, and
   data memory means for storing, a machine-readable data set unique to a user, said data memory means spaced from said first magnetic strip,
   a rechargeable power cell embedded in said user card,
   an electromagnet embedded in said user card electrically connected to said power cell,
   a microelectronic clip for directing said power cell to energize said electromagnet to create a magnetic field, and
   a portion of said magnetic strip overlaying a portion of said electromagnet so that, upon creation of a magnetic field by said electromagnet, data encoded in said overlaying portion of said magnetic strip is erased,
   means for charging said power cell in said user card, and
a data management device having
   means for reading provider data on said magnetic strip on said user card and said unique user data set on said data memory means on said user card,
   storage means for storing comparison data related to said unique user data on said data memory means,
   comparison means for comparing said unique user data on said data memory means on said user card with said comparison data on said storage memory means to generate an authentication signal upon favorable comparison of said unique user data set on said data memory means with said comparison data on said storage memory means,
   sensor means for scanning fingerprints to generate an electronic representation of a scanned fingerprint,
   means for activating said sensor means in response to generation of said authentication signal by said comparison means,
   fingerprint memory means for storing an electronic digital representation of a user's fingerprint,
   means for comparing the electronic representation of a scanned fingerprint with the electronic digital representation of a user's fingerprint to generate a validation signal upon favorable comparison of the electronic representation of a scanned fingerprint with the electronic digital representation of a user's fingerprint, and
   a provider data set retrieval system comprising
      means for activating said provider data set retrieval system in response to generation of said validation signal,
      means for reading a provider data set contained on a provider data card,
      data set memory means for storing a plurality of provider data sets, and
      means for writing a duplicate of a provider data set from a provider data card on said magnetic strip on said user card.

25. The multiple card data system of claim 24 wherein
said data memory means on said user card includes a magnetic strip.

26. The multiple card data system of claim 24 wherein
said data memory means on said user card includes microelectronic circuitry.

27. The multiple card data system of claim 24 including
display means for displaying visually readable indicia, and
input means for controlling said data management device.

28. A multiple card data system comprising
a user card having
   a first magnetic strip for storing machine-readable provider data, and
   a second magnetic strip for storing a machine-readable set unique to a user,
   said second magnetic strip spaced from said first magnetic strip,
   a rechargeable power cell embedded in said user card,
   an electromagnet embedded in said user card electrically connected to said power cell;
   a microelectronic chip for directing said power cell to energize said electromagnet to create a magnetic field, and
   a portion of said first magnetic strip overlaying a portion of said electromagnet so that, upon creation of a magniietic field by said electromagnet, data encoded in said overlaying portion of said first magnetic strip is erased,
   means for charging said power cell in said user card, and
a data management device having
   a slot having an opening and a distal end opposite said opening sized to receive freely said user card,
   means for stationary disposition of said user card in said slot,
   means for activation of said data management device adjacent said distal end of said slot,
   a data card reader/writer having,
   a motor anchored to said data management device,
   a rotatable drive shaft controlled by said motor, said drive shaft having opposing ends and a first pair of pulleys attached one to each said end, a rotatable cooperating shaft disposed parallel to said drive shaft anchored to said data management device, said cooperating shaft spaced from said drive shaft substantially at least the length of a magnetic strip on a data card, said cooperating shaft further having opposing ends and a second pair of pulleys attached one to each said end, flexible means running between said first pair of pulleys and said second pair of pulleys for simultaneous rotation of said second pair of pulleys upon rotation of said first pair of pulleys, a cross bar disposed parallel to said drive shaft attached to said flexible means moveable between and parallel to said drive shaft and said cooperating shaft, said cross bar having a first read/write head for reading and writing on said first magnetic strip and a second read/write head for reading and writing on said second magnetic strip on said user card, a spring having a first end attached to said cross bar biasing said cross bar towards said drive shaft, movement of said cross bar towards said cooperating shaft tensioning said spring, means for activating said motor for movement of said cross bar towards said cooperating shaft, and means for cutting power to said motor when said cross bar moves near said cooperating shaft so that said spiring returns said cross bar to a position adjacent said drive shaft, said data management device further having means for reading provider data on said first magnetic strip on said user card and said unique user data set on said second magnetic strip on said user card, storage means for storing comparison data related to said unique user data set on said second magnetic strip, comparison means for comparing said unique user data on said second magnetic strip with said comparison data on said memory means to generate an authentication signal upon favorable comparison of said unique user data set on said second magnetic strip with said comparison data on said memory means, sensor means for scanning fingerprints to generate an electronic representation of a scanned fingerprint, means for activating said sensor means in response to generation of said authentication signal by said comparison means, fingerprint memory means for storing an electronic digital representation of a user's fingerprint, means for comparing the electronic representation of a scanned fingerprint with the electronic digital representation of a user's fingerprint to generate a validation signal upon favorable comparison of the electronic representation of a scanned fingerprint with the electronic digital representation of a user's fingerprint, display means for displaying visually readable indicia, input means for controlling said data management device, and a provider data set retrieval system comprising means for activating said provider data set retrieval system in response to generation of said validation signal, means for reading a provider data set contained on a provider data card, data set memory means for storing a plurality of provider data sets, and means for writing a duplicate of a provider data set from a provider data card on said first magnetic strip on said user card.

29. A time-delayed erasable data card comprising a data card having a magnetic strip, a rechargeable power cell embedded in said data card, an electromagnet embedded in said data card electrically connected to said power cell, means embedded in said data card for directing said power cell to energize said electromagnet to create a magnetic field, means for charging said power cell, and a portion of said magnetic strip overlaying a portion of said electromagnet so that, upon creation of a magnetic field by said electromagnet, any previously encoded data in said overlaying portion of said magnetic strip is erased.

30. The erasable data card of claim 29 including a second memory spaced from said magnetic strip.

31. The erasable data card of claim 30 wherein said second memory is a magnetic strip.

32. The erasable data card of claim 29 wherein said means for directing said power cell to energize said electromagnet is a microelectronic chip.

33. A data card reader for reading a data card leaving a first magnetic strip and a second magnetic strip spaced from the first magnetic strip, comprising, a motor, a rotatable drive shaft controlled by said motor, said drive shaft having two opposing ends and a first pair of pulleys attached one to each said end, a rotatable cooperating shaft disposed parallel to said drive shaft, said cooperating shaft spaced from said drive shaft substantially at least the length of a magnetic strip on a data card, said cooperating shaft further having two opposing ends and a second pail or pulleys attached one to each said end, flexible means running between and connecting said first pair of pulleys and said second pair of pulleys for simultaneous rotation of said second pair of pulleys upon rotation of said first pair of pulleys, a cross bar disposed parallel to said drive shaft and attached to said flexible means moveable between and parallel to said drive shaft and said cooperatng shaft, said cross bar having a first read head for reading the first magnetic strip and a second read head for reading the second magnetic strip on the data card, a spring having a first end attached to said cross bar biasing said cross bar towards said drive shaft, movement of said cross bar towards said cooperating shaft tensioning said spring, means for activating said motor for movement of said cross bar towards said cooperating shaft, and means for cutting power to said motor when said cross bar moves near said cooperating shaft so that said spring returns said cross bar to a position adjacent said drive shaft.

34. The data card reader of claim 33 wherein
said first read head includes a write head for writing on said first magnetic strip.

35. The data card reader of claim 34 wherein
said second read head includes a write head for writing on said second magnetic strip.

36. A data card reader for reading a data card having a first magnetic strip and a second magnetic strip spaced from the first magnetic strip, comprising a rigid framework having a first guide member and a second guide member parallel to said first guide member, each said guide member having a longitudinal slot, a cross bar having a first end and a second end, said first end of said cross bar slidingly disposed within said slot of said firt guide member, said second end of said cross bar slidingly disposed within said slot of said second guide member, said first end of said cross bar further hvaing a knob located outside of said slot of said first guide member, means for holding said cross bar sliding normal to said guide members, said cross bar having a first head means for reading the first magnetic strip and a second head means for reading the second magnetic strip, said cross bar movable between a first position and a second position spaced from said first position substantially at least the length of a magnetic strip on a data card.

37. The data card reader of claim 36 including
a spring means attached to said cross bar for biasing said cross bar towards said first position.

38. The data card reader of claim 37 wherein
said slots of said guide members are tapered.

39. A method for allowing a single user card to act as a substitute for any one of a multiple of provider data cards, which comprises supplying a user card for transactional interfacing with a data management device, said user card having
first memory means for rerecordably storing a machine-readabl provider data, and
second memory means for storing a machine-readable data set unique to a user, said second memory means spaced from said first memory means,
storing comparison data related to said unique user data set on storage means on a data management device,
comparing said unique user data set on said user card with said comparison data on said storage means on said data management device,
generating an authentication signal upon favorable comparison of said unique user data set on said user card with said comparison data on said storage means on said data management device,
activating a sensor means for scanning fingerprints in response to said authentication signal,
storing an electronic digital representation of the user's fingerprint in a fingerprint memory means on said data management device,
scanning a fingerprint to create an electronic representation of the fingerprint,
comparing the electronic representation of the fingerprint with the stored electronic digital representation of the user's fingerprint,
generating a validation signal upon favorable comparison of the electronic representation of the fingerprint with the stored electronic digital representation of tle user's fingerprint,
activating a provider data set retrieval system in response to said validation signal,
reading provider data sets contained on a plurality of provider data cards,
storing said provider data sets on a data set memory means on said data management device, and
writing a duplicate of a provider data set from a single provider data card on said first memory means on said user card.

40. The method of claim 39 including generating a random number, storing a copy of said random number on said storage means on said data management device prior to terminating a transaction with said user card, storing a copy of said random number on said second memory means on said user card prior to terminating a transaction with said data management device, as part of the step of comparing said unique user data set on said user card with said comparison data on said storage means on said data management device, comparing said copy of said random number on said second memory means on said user card with said copy of said random number on said storage means on said data management device.

* * * * *

UNITED STATES PATENT AND TRADEMARK OFFICE
CERTIFICATE OF CORRECTION

PATENT NO : 6,012,636
DATED : January 11, 2000
INVENTOR(S): Frank E. Smith, Jr.

It is certified that error appears in the above-identified patent and that said Letters Patent is hereby corrected as shown below:

Column 1, line 13, delete the comma after "modifying."

Column 1, line 25, delete the parenthesis before "grocery."

Column 2, line 26, add a period after "barriers."

Column 2, line 33, delete the space between "I" and "his."

Column 3, line 51, replace "scanners" with –scanner,–.

Column 3, line 53, replace "insane" with –image–.

Column 4, line 22, delete the parenthesis and comma after "according."

Column 4, line 41, delete the comma after "storing."

Column 4, line 50, replace "(venerated" with –generated –.

Column 4, line 54, change "device with" to –device. With–.

Column 4, line 62, delete the period after "validity."

Column 5, line 10, delete the parenthesis in "PIN."

UNITED STATES PATENT AND TRADEMARK OFFICE
CERTIFICATE OF CORRECTION

PATENT NO : 6,012,636
DATED : January 11, 2000
INVENTOR(S): Frank E. Smith, Jr.

It is certified that error appears in the above-identified patent and that said Letters Patent is hereby corrected as shown below:

Column 5, line 21, replace "finge-print" with –fingerprint–.

Column 5, line 51, delete the dash after "user."

Column 5, line 55, change "drivers" to –driver's–.

Column 5, line 65, change "store" to –stored–.

Column 6, line 56, delete the parenthesis and comma after "having."

Column 6, line 58, delete the comma after "providing."

Column 6, line 66, change "Substitute" to –substitute–.

Column 7, line 11, delete the comma after "providing."

Column 8, line 21, change "venerated" to –generated–.

Column 8, line 29, delete the comma after "having."

UNITED STATES PATENT AND TRADEMARK OFFICE
CERTIFICATE OF CORRECTION

PATENT NO : 6,012,636
DATED : January 11, 2000
INVENTOR(S): Frank E. Smith, Jr.

It is certified that error appears in the above-identified patent and that said Letters Patent is hereby corrected as shown below:

Column 8, line 30, change "or" to --for--.

Column 9, beginning at line 18, delete the following paragraph:

"An alternative embodiment of a two strip reader as shown in Fig. 9 is not motorized. Guide members 76 each provide opposing rails 78. Movement of the cross bar 80 is accomplished manually by moving knob 82. The cross bar 80 is held normal to guide members 76 by dual track members 84 on each end of the cross bar 80. Movement of the knob 82 slides read or read/write heads across magnetic strips on a data card."

and replace it with:

--An alternative embodiment of a two strip reader is not motorized. Opposing rails are provided in guide members. Movement of a cross bar similar to that shown in Figure 5a is accomplished manually by moving a knob. Dual track members provided on each end of the cross bar hold

UNITED STATES PATENT AND TRADEMARK OFFICE
CERTIFICATE OF CORRECTION

PATENT NO : 6,012,636
DATED : January 11, 2000
INVENTOR(S): Frank E. Smith, Jr.

It is certified that error appears in the above-identified patent and that said Letters Patent is hereby corrected as shown below:

the cross bar normal to the guide members. Movement of the knob slides read or read/write heads across magnetic strips on a data card.--

Claim 1, page 12, line 42, change "venerate" to --generate--.

Claim 9, page 13, line 57, delete the comma after "having."

Claim 20, page 15, line 18, change "comm ands" to --commands--.

Claim 28, page 16, line 37, add --data-- after "machine-readable."

Claim 28, page 16, line 42, delete the semicolon after "cell" and add a comma.

Claim 28, page 16, line 49, change "magniietic" to --magnetic--.

Claim 33, page 18, line 34, change "leaving" to --having--.

Claim 33, page 18, line 45, change "pail or" to --pair of--.

Claim 36, page 19, line 17, change "firt" to --first--.

Claim 36, page 19, line 20, change "hvaing" to --having--.

UNITED STATES PATENT AND TRADEMARK OFFICE
CERTIFICATE OF CORRECTION

PATENT NO : 6,012,636
DATED : January 11, 2000
INVENTOR(S): Frank E. Smith, Jr.

It is certified that error appears in the above-identified patent and that said Letters Patent is hereby corrected as shown below:

Claim 39, page 19, line 43, change "readabl" to –readable–.

Claim 39, page 20, line 20, change "tle" to –the–.

Signed and Sealed this

Nineteenth Day of December, 2000

Q. TODD DICKINSON

Attest:

Attesting Officer

Commissioner of Patents and Trademarks